(12) United States Patent
Krämer et al.

(10) Patent No.: US 12,111,424 B2
(45) Date of Patent: Oct. 8, 2024

(54) SAFETY LASER SCANNER AND METHOD FOR FRONT SCREEN MONITORING

(71) Applicant: SICK AG, Waldkirch (DE)

(72) Inventors: Joachim Krämer, Waldkirch (DE); Markus Hammes, Waldkirch (DE); Ino Geisemeyer, Waldkirch (DE)

(73) Assignee: SICK AG, Waldkirch (DE)

( * ) Notice: Subject to any disclaimer, the term of this patent is extended or adjusted under 35 U.S.C. 154(b) by 918 days.

(21) Appl. No.: 17/169,019

(22) Filed: Feb. 5, 2021

(65) Prior Publication Data

US 2021/0247503 A1 Aug. 12, 2021

(30) Foreign Application Priority Data

Feb. 7, 2020 (EP) ..................................... 20156075

(51) Int. Cl.
*G01S 7/497* (2006.01)
*G01S 7/481* (2006.01)
(Continued)

(52) U.S. Cl.
CPC ............ *G01S 7/497* (2013.01); *G01S 7/4814* (2013.01); *G01S 7/4817* (2013.01); *G01S 17/04* (2020.01); *G01S 17/08* (2013.01)

(58) Field of Classification Search
CPC ........ G01S 7/497; G01S 17/04; G01S 7/4814; G01S 7/4817; G01S 17/08
See application file for complete search history.

(56) References Cited

U.S. PATENT DOCUMENTS

| 2013/0250302 A1 | 9/2013 | Kramer |
| 2020/0174156 A1* | 6/2020 | Terefe ..................... G01S 17/95 |
| 2021/0063318 A1* | 3/2021 | Frederiksen .......... G01S 7/4817 |

FOREIGN PATENT DOCUMENTS

| DE | 4345446 C2 | 7/1998 |
| DE | 202013102440 U1 | 10/2014 |

(Continued)

OTHER PUBLICATIONS

Search Report dated Jun. 29, 2020 issued in corresponding European Application No. 20156075.2.

*Primary Examiner* — Isam A Alsomiri
*Assistant Examiner* — Joseph C Fritchman
(74) *Attorney, Agent, or Firm* — Nath, Goldberg & Meyer; Jerald L. Meyer; Llirian Durri (57) ABSTRACT

A safety laser scanner (10) for detecting objects in a monitored zone (20) is provided that has a light transmitter (12) for transmitting a scan beam (16), a movable deflection unit (18) for the periodic scanning of the monitored zone (20) by the scan beam (16), a light receiver (26) for generating a received signal from the scan beam (22) remitted by the objects, a front screen (38), and a control and evaluation unit (32) that is configured to acquire information on the objects in the monitored zone (20) from the received signal and to recognize an impaired light permeability of the front screen (38) in a front screen monitoring by evaluating a front screen reflection beam (54) that is generated from the scan beam (16) by reflection at the front screen (38), At least one light deflection unit (56, 58) is provided in the optical path of the front screen reflection beam (54) that guides the front screen reflection beam (54) to the front screen (38) again in a region (60) to be tested so that a twice-reflected front screen reflection beam (62) is produced by reflection at the region (60) to be tested.

15 Claims, 4 Drawing Sheets

(51) Int. Cl.
    *G01S 17/04*          (2020.01)
    *G01S 17/08*          (2006.01)

(56)           References Cited

FOREIGN PATENT DOCUMENTS

| | | | |
|---|---|---|---|
| DE | 102015105264 A1 | 10/2016 | |
| EP | 2237065 A1 | 10/2010 | |
| EP | 2482094 A1 * | 8/2012 | ........... G01S 7/4812 |
| EP | 2482094 B1 | 6/2013 | |
| EP | 2642314 A1 | 9/2013 | |
| EP | 2927711 A1 | 10/2015 | |

* cited by examiner

SAFETY LASER SCANNER AND METHOD FOR FRONT SCREEN MONITORING

The invention relates to a safety laser scanner and to a method for front screen monitoring in accordance with the preambles of claims 1 and 15 respectively.

Laser scanners are frequently used for optical monitoring. In this respect, a light beam generated by a laser periodically sweeps over a monitored zone with the help of a deflection unit. The light is re-emitted at objects in the monitored zone and is evaluated in the scanner. A conclusion is drawn on the angular location of the object from the angular position of the deflection unit and additionally on the distance of the object from the laser scanner from the time of flight while using the speed of light. In this respect, two general principles are known to determine the time of flight. In phase-based processes, the transmitted light is modulated and the phase shift of the received light with respect to the transmitted light is evaluated. In pulse-based processes, such as are preferably used in safety technology, the laser scanner measures the time of flight until a transmitted light pulse is received again.

A safety laser scanner, that is a laser scanner configured for safety engineering, has the object of safeguarding a hazard source and of above all avoiding accidents with persons. In this respect, the laser scanner monitors a protected field which may not be entered by an operator during the operation of the machine. Since the laser scanner acquires angle and distance information, two-dimensional positions of objects in the monitored zone and thus also in the protected field can be determined. If the laser scanner recognizes an unauthorized intrusion into the protected field, for instance a leg of an operator, it triggers an emergency stop of the machine.

Sensors used in safety technology have to work particularly reliably and must therefore satisfy high safety demands, for example the EN13849 standard for safety of machinery and the machinery standard EN61496 for electrosensitive protective equipment (ESPE). A number of measures have to be taken to satisfy these safety standards such as safe electronic evaluation by redundant, diverse electronics, function monitoring and/or provision of individual test targets with defined degrees of reflection which have to be recognized at the corresponding scan angles.

A further one of these safety demands is the recognition of an impairment of the transmission of a front screen of the laser scanner which has to be responded to by a safety relevant shutdown on a restriction of the detection ability. In this respect, both a homogeneous contamination, for instance by dust, and a spot-like impairment by small interfering objects from a fixed minimum size onward have to be revealed. A deliberate manipulation by covering front screen regions by small shading objects must likewise be precluded.

A laser scanner typically uses optical test channels that check different positions of the front screen region by means of translumination to reveal such interfering influences. In a solution known, for example, from DE 43 45 446 C2, a plurality of independent optical test channels are distributed over the total angular range of the front screen and accordingly transluminate different regions of the front screen test-wise and thereby recognize impaired transmission. The distribution of the test channels has to be sufficiently dense to reliably detect the small contamination or manipulation objects required by the standard everywhere despite an only spot-like detection. A large number of test channels naturally increases the manufacturing costs and the required construction space. In addition, the test channels are very close to the outer contour of the laser scanner to evade the rotating deflection unit. They are thus susceptible to interference due to extraneous light and reflectors located randomly or in proximity for manipulation.

With laser scanners having a biaxial design, that is transmission and reception light beams running next to one another, local contamination or manipulations are more problematic than with a coaxial design. Such occlusions of parts of the optical reception path reduce the received signal and can result in a loss of detection. They are simulated by different test spots and are tested to satisfy the standard. The problem is by no means present to the same degree with a coaxial design since either only a small portion of the optical reception path is affected, which does not cause any failures, or the transmitted beam is also blocked and this was recognized. A biaxially designed laser scanner requires a particularly large number of test channels for this reason.

EP 2 237 065 A1 discloses a laser scanner in which the complete measuring unit with the light source and the detector rotates. A test light source and a test detector are moreover accommodated on the corresponding rotor while a reflector element is arranged outside the housing. The test light source and the test detector thus scan the front screen in the course of the rotation with the aid of the reflector element. Since the test light detector is necessarily outwardly directed, it is relatively easily disturbed by extraneous light.

In DE 10 2015 105 264, test channels are guided through the front screen via a reflector rotated along with the rotating mirror. Finally, DE 10 2015 105 264 A1 discusses different concepts to check the transmission capability. An option of branching off a portion of the actual scan beam is listed here. However, this approach is considered disadvantageous since crosstalk in the actual measurement channel is to be feared.

With a laser scanner in accordance with DE 2013 102 440 U1, the contamination measurement is based on test channels that measure reflectively instead of transmissively. However, this neither reduces the effort for a single test channel nor is the number of required test channels thereby reduced.

A laser scanner is known from EP 2 482 094 B1 that evaluates a reflection at the inner side of the front screen. However, this is done in a rear dead zone at a deliberately mirror coated portion of the front screen for a check of the functioning capability of the measurement system. The transmission of the front screen might not be evaluated at all due to the mirror coating and it Is additionally the light transmission in the field of view that would have to be ensured and not in the dead zone.

EP 2 642 314 A1 spans test light paths by test light transmitters arranged outwardly around the front screen whose test light is then received in the light receiver of the main measurement system after multiple deflection at the front screen and at further reflectors. This admittedly saves test light receivers, but is still the basic principle of the test channels distributed around the front screen.

It is known from EP 2 927 711 A1 to check the functional capability of the measurement system using a test light transmitter. In an embodiment, its test light path runs via a reflection at the front screen. It is mentioned that this could be used in a dual function for a check of the front screen for contaminants. Since, however, the test light transmitter is only provided at points with a single scan angle, the front screen would thus not be sensibly testable and anyway an additional test light sensor would be required for every section of the front screen to be tested so that the hardware effort for the test channels would still be considerable It is therefore the object of the invention to improve the monitoring of the front screen of a safety laser scanner.

This object is satisfied by a safety laser scanner and by a method for front screen monitoring in accordance with claim 1 and claim 15 respectively. The laser scanner is a safety laser scanner and is accordingly usable in operator protection to avoid accidents, in particular at machines in an industrial environment or at autonomous vehicles. Measures have been implemented for this purpose that protect the safety laser scanner from failures or that reveal errors to be able to initiate a safety relevant response in good time when a hazard has been recognized or when the safety laser scanner cannot ensure its function. These measures have been fixed for specified safety levels in corresponding safety standards for machine safety or for electrosensitive protective equipment of which some were named in the introduction. The front screen monitoring is one of the measures.

A light transmitter transmits a scan beam that periodically scans the monitored zone with the aid of a movable deflection unit and a light receiver generates a received signal from the scan beam returning after re-emission or reflection at an object. These components are the core of a main measurement system of the laser scanner. A rotating mirror is preferably provided as a deflection unit or the main measurement system is in total accommodated in a rotating measurement head.

A control and evaluation unit evaluates the received signal of the light receiver to acquire information on the scanned objects, in particular to measure their distances using a time of flight method. In addition, a front screen reflection beam is evaluated that is created by reflection of the scan beam inwardly at the front screen. The front screen monitoring for its sufficient light permeability is consequently based on the light transmitter of the main measurement system.

The invention starts from the basic idea of guiding the front screen reflection beam, that is necessarily produced at the passage point of the scan beam, to a further region of the front screen to be tested. The front screen reflection beam is there reflected a further time and a twice-reflected front screen reflection beam is produced. At least one light deflection element such as a mirror or a prism is arranged in the optical path of the front screen reflection beam for this beam guidance. The portion of the front screen reflection beam reflected and/or transmitted in the further region of the front screen to be tested is used for the evaluation of the light permeability of the front screen.

The invention has the advantage that the disadvantages named in the introduction are avoided and the effort for the front screen monitoring is reduced. No test channels or at least fewer test channels are required depending on the embodiment. Manufacturing costs, complexity, and construction size are reduced. Conventionally, a reflective front screen monitoring is not used in safety laser scanners since previously dark dust could not be detected sufficiently reliably that can, however, by all means cause a detection loss. In accordance with the invention, the test and manipulation spots that are representative for dust collections of average re-emission and, for example, manipulation labels that are required by safety standards are recognized and, where necessary, dark dust is already recognized by a few supplementary test channels.

The control and evaluation unit is preferably configured to evaluate the received signal generated by the twice-reflected front screen reflection beam in the light receiver for the front screen monitoring. The twice-reflected front screen reflection beam is hereby evaluated in the main measurement system; in other words, the front screen monitoring is integrated in the main measurement system. No additional hardware is required except for the passive light deflection element. The additional effort to obtain a front screen monitoring is restricted to a corresponding evaluation function of the control and evaluation unit.

The safety laser scanner preferably has at least one external additional light receiver and a portion of the front screen reflection beam transmitting the region to be tested is incident on said external additional light receiver, with the control and evaluation unit being configured to evaluate the received signal of the receiver for additional light for the front screen monitoring. Complementary to the twice-reflected front screen reflection beam, the portion of the front screen reflection beam transmitted in the further region to be tested is now evaluated here. Both do not preclude one another, that is both the reflected portion and the transmitted portion of the front screen reflection beam incident on the region to be tested are also evaluated.

The light transmitter and the light receiver are preferably arranged next to one another with mutually parallel optical axes in a biaxial design. Conventionally, a coaxial design is frequently used instead in which the smaller cross-section of the transmitted beam is disposed centrally in the received beam. A biaxial arrangement is, however, particularly simpler with a very small construction. The front screen monitoring in accordance with the invention is also suitable for the biaxial arrangement for which conventionally a particularly large number of test channels would be necessary.

The safety laser scanner preferably has at least one pair of test light transmitters and test light receivers for an additional front screen monitoring that are arranged in the manner of a through beam light barrier or of a reflection light barrier to check a partial region of the front screen for light permeability by a transmission measurement. This corresponds to the conventional test channels in accordance with the principle of a through beam or reflection light barrier. The latter has the advantage that a reflector of small size without connectors is sufficient internally, while the associated test light transmitter and test light receiver pair can be arranged externally. The combination of a front screen monitoring from the front screen reflection light beam and conventional test channels is able to reliably detect all impairments of the light permeability of the front screen to be detected, with only a few test channels being required in comparison with the prior art. This is due to the fact that at least those scenarios that would require particularly dense test channels are taken over by the evaluation of the front screen reflection beam.

The light deflection unit is preferably only provided in at least one partial region of a field of view of the safety laser scanner so that the front screen monitoring based on the front screen reflection beam only relates to the partial region. The field of view (FOV) in a laser scanner is indicated by a scan angle range that, for example, comprises 180°, 270°, or up to 360°. The front screen monitoring based on evaluating the front screen reflection beam can remain restricted to particularly critical partial regions, with there also being able to be a plurality of such partial regions or angular intervals. The remaining field of view is covered, for example, by conventional test channels. The object of the test channels can, for example, be the detection of homogeneous contamination with dark dust. Due to the assumption of a homogeneous distribution, these test channels can leave monitoring gaps or can, in other words, test front screen regions at random. The safety standards require, for example, a 45° segment of a damping film so that 270° are already covered by six test channels. The detection of test spots that represent a local contamination or manipulation has to be gapless in contrast. Ten, sixteen, or even more test channels would then be needed for this purpose. These test spots are, however, not dark in accordance with the safety standards, but rather have a re-emission capability of 20%. This is detected well by evaluating the front screen reflection beam so that the additional test channels can be dispensed with. The two components of the front screen monitoring therefore effectively complement one another and allow the total number of required test channels to be substantially reduced. It must still be mentioned that it is never necessary to monitor the total front screen, but rather only that portion in which the scan beam actually enters or exits.

The partial region is preferably a marginal region between the field of view of a dead zone outside the field of view. Previous safety laser scanners do not have a 360° all-round view, even though this would be conceivable in principle, but rather a restricted angle of view range of, for example, 270° and are thus so-to-say blind toward the rear. This angular range, in the numerical example of 270°-360°, is called a dead zone since no objects are detected there. There are two marginal regions in the transition from the angle of view range to the dead zone and from the dead zone to the angle of view range, for example at 270° and at 360°. These marginal regions conventionally require a particularly large number of test channels, particularly with a biaxial design of the safety laser scanner.

The light deflection element is preferably provided in the dead zone. A specific demand of the safety standards is detecting a test spot having a specific minimum extent. It is conceivable due to this finite extent to evaluate the front screen reflection beam at a scan angle that is in the dead zone, that is for example at 275°, that then so-to-say retroactively tests the marginal region up to 270° and correspondingly at 355° the marginal region from 0° onward.

The control and evaluation unit is preferably configured to adapt the sensitivity of the detection of the twice-reflected front screen reflection beam in the light receiver and/or the evaluation of the received signal thereby generated in the marginal region. If the front screen monitoring takes place on the basis of the front screen reflection beam in the marginal region and in particular already in the dead zone where the main measurement system is not required, an adaptation solely to the needs of the front screen monitoring is possible. At scan angles within the visual field, the demands of the object recognition and of the front screen monitoring are often contradictory and the object detection determines the reading of, for example, the sensitivity. The sensitivity for the front screen monitoring is preferably set such that contaminants are detected reliably, but not too sensitively. The sensitivity can, for example, control an amplification of the light receiver or thresholds in the evaluation of the received signal via the output power of the light transmitter, for example.

The front screen preferably has the shape of a rotating member and, in section, a curved contour. Examples for this shape of the front screen are a truncated cone or a spherical section or preferably a cup having a contour which is curved in cup shape and whose curvature reduces from bottom to top. The curvature provides that the front screen reflection is not directly reflected back into the light receiver and dazzles it. The front screen reflection beam is again very substantially attenuated by the second reflection in the further region to be tested. The rotating member does not have to comprise the full 360°, but only the field of view of, for example, 270°, with a complete rotating member, also being conceivable with fields of view of less than 360° for construction reasons, but equally also a different shape, for example a flat construction shape in the region of a dead zone.

The safety laser scanner preferably has a first and a second light deflection element in the optical path of the front screen reflection beam, with in particular the first light deflection element being arranged at a centrally arranged motor holder and the second light deflection unit being arranged at a cover of the safety laser scanner. The front screen reflection beam is therefore deflected twice before it is incident on the further region of the front screen to be tested. The light deflection elements can be configured as reflective surfaces of in particular the motor holder or hood cover. The number of light deflection elements relates to a respective fixed scan angle, i.e. light deflection elements in the beam path of the same front screen reflection beam. There can also only be a total of two light deflection elements that are then formed in ring shape peripherally in the scan direction or a plurality of light deflection elements are arranged distributed over the different scan angles.

The light deflection element is preferably formed as beam attenuating. Blacking out is carried out for this purpose, for example. The front screen reflection beam is admittedly already considerably attenuated with respect to the scan beam due to the reflections at the front screen. An additional attenuating is nevertheless advantageous to set an appropriate sensitivity of the front screen monitoring and to avoid unnecessary scattered light in the safety laser scanner. As already stated, the sensitivity of the main measurement system is oriented on its requirements except for optionally in the dead zone and is therefore not a controllable parameter for the front screen monitoring. If the front screen reflection beam is deflected multiple times by a plurality of light deflection elements, the attenuating can take place in one or more of these light deflection elements.

A reference light receiver is preferably arranged in the optical path of the front screen reflection beam, in particular at a light deflection element. The measurement of the front screen reflection beam can thus be supported by the light receiver or by an external additional light receiver or can also be replaced at at least some scan angles. The reference light receiver can also serve for a test of the function of the main measurement system; it can, for example, monitor the transmission power of the light transmitter or the time of flight up to the reference light receiver is determined.

A light deflection element and a light trap are preferably respectively partially arranged in the direction of revolution of the movement of the deflection unit to enable a differential front screen monitoring by a comparison of the received signals. The arrangement is in particular alternating. A differential measurement thereby becomes possible that enables a more reliable distinction of a near object in the monitored zone and a detection of a front screen contamination. The measurement results in the near zone are thus improved.

The safety laser scanner is preferably configured as a multilayer scanner having a plurality of scan beams separated in elevation, with at least one of the scan beams being used for the front screen monitoring. A multilayer scanner uses not only one, but rather a plurality of scan beams and accordingly monitors a plurality of monitored planes. With a sufficient number or density of the scan beams, it is sufficient for the front screen monitoring to be based on one or some of these scan beams. If the monitoring gap in elevation is tolerable, one scan beam can even be used in a dedicated manner only for the front screen monitoring.

The safety laser scanner preferably has a safe output whose control and evaluation unit is configured to compare the position of detected objects with protected fields and to control the safe output by a safeguarding signal on recognition of an unauthorized protected field intrusion. The protected field monitoring is a proven procedure to avoid accidents at dangerous machinery. If an unauthorized protected field intrusion is recognized, a safety relevant response of a machine monitored by the safety laser scanner is initiated over a safe output (OSSD. output signal switching device), with a safety controller optionally being interposed that optionally evaluates and suppresses the safeguarding signal.

The method in accordance with the invention can be further developed in a similar manner and shows similar advantages in so doing. Such advantageous features are described in an exemplary, but not exclusive manner in the subordinate claims dependent on the independent claims.

Figure 1:
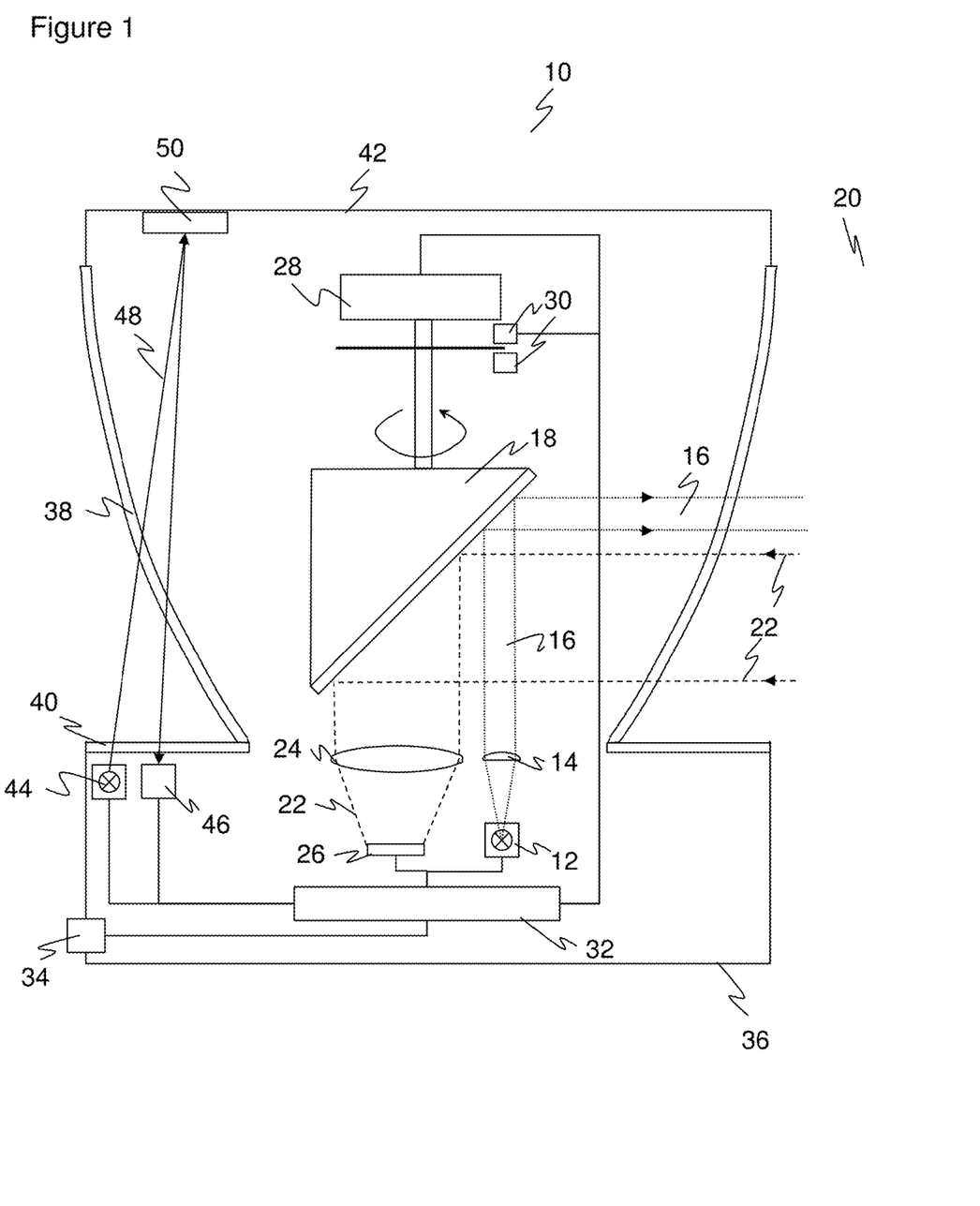
FIG. 1 a sectional representation of a safety laser scanner.

The invention will be explained in more detail in the following also with respect to further features and advantages by way of example with reference to embodiments and to the enclosed drawing. The Figures of the drawing show in:

FIG. 1 shows a schematic sectional representation through a laser scanner 10 that is in particular designed as a safety laser scanner. The difference between a safety laser scanner configured in accordance with the standard and a simple laser scanner was explained in the introduction.

A light transmitter 12, for instance a laser in the form of an edge emitter or of a VCSEL, transmits a light signal that is periodically amplitude modulated or that preferably has at least one short light pulse. The transmitted light is collimated by a transmission optics 14 to form a transmitted light beam 16 that is guided via a movable deflection unit 18 into a monitored zone 20 and is there re-emitted or reflected by an object that may be present. Some of this light returns as an incident re-emitted light beam 22 to the laser scanner 10 and is deflected by the deflection unit 18 to a reception optics 24 and from there is bundled onto a light receiver 26, for example a photodiode or an APD (avalanche photodiode). The laser scanner 10 in accordance with FIG. 1 has a biaxial arrangement in which the transmitted light beam 16 runs next to the incident re-emitted light beam 22. This is a preferred embodiment of the invention, but is initially only to be understood by way of example.

The deflection unit 18 can be designed as an oscillating mirror, but is as a rule a rotating mirror that continuously rotates by a drive of a motor 28. Alternatively, no rotating mirror is provided, but the deflection unit 18 is rather designed as a rotating measurement head together with a light transmitter 12 and a light receiver 26. The respective angular position of the deflection unit 18 is detected via an encoder 30. The light beam 16 generated by the light transmitter 12 thus sweeps over the monitored zone 20 generated by the movement. If a re-emitted light beam 22 is received by the light receiver 26 from the monitored zone 20, a conclusion can be drawn on the angular position of the object in the monitored zone 20 from the angular position of the deflection unit 18 by means of the encoder 30.

In addition, the time of flight from the transmission of the light beam 16 up to the reception of the re-emitted light beam 22 after reflection at the object in the monitored zone 20 is determined. All time of light processes are conceivable for this. A conclusion is drawn on the distance of the object from the laser scanner 10 from the time of flight of light while using the speed of light. This evaluation takes place in an evaluation unit 32 which is connected for this purpose to the light transmitter 12, to the light receiver 26, to the motor 28 and to the encoder 30.

Two-dimensional polar coordinates of all the objects in the monitored zone 20 are then available via the angle and the distance. Two-dimensional protected fields into which unauthorized objects such as operators or their body parts may not intrude can thus be defined in the monitored zone 20. If the evaluation unit 32 recognizes an unauthorized protected field intrusion, a safety relevant shutdown signal is output via a safe output 34 (OSSD, output signal switching device) to, for example, stop a monitored hazardous machine or to move it into a non-dangerous position. Alternatively, measurement data are output via the output 34, above all when the laser scanner 10 is not a safety laser scanner and accordingly does not monitor any protected fields.

All the named functional components are arranged in a housing 36 which has a peripheral front screen 38 in the region of the light exit and of the light entry. The front screen 38 is frequently, but not necessarily, formed as a rotating member and also does not necessarily have to extend over 360° in both cases so that then a certain angular range remains as a dead zone. The front screen 38 has a contour in section that is curved in the manner of a cup in the example of FIG. 1. A different curvature and even a straight contour are also conceivable, however, which then results in the shape of a truncated cone overall. In the lower region, the front screen 38 is closed by a base 40; in the upper region by a hood cover 42.

To monitor the front screen 38 for light permeability, a plurality of test passages are provided distributed over the periphery of which only one test channel can be recognized in the sectional representation. A test light transmitter 44 and a test light receiver 46 are arranged externally with respect to the front screen 38, but can nevertheless be accommodated in the base 40 within the laser scanner 10. The test light 48 of the test light transmitter 44 first passes through the base 40 to the outside and then transilluminates the front screen 38 into the interior of the laser scanner 10. It is there reflected at a test light reflector 50 that is attached to the hood cover 42 and returns to the test light receiver 46 while again transilluminating the front screen 38 and the base 40.

In an alternative embodiment, the test passages are not set up, as shown, in accordance with the principle of a reflection light barrier, but rather as a through-beam light barrier, where the test light receiver 46 is then attached inwardly at the position of the test light reflector 50 and the test light reflector 50 is omitted.

The evaluation unit 32 can check with reference to the test signal of the test light receiver 46, for example by a comparison with a desired level, whether the light permeability of the front screen 38 is impaired at the passage points of the test light 48. On a recognition of an impairment that no longer ensures the safe function of the laser scanner 10, a safety relevant response is triggered.

The test channels shown in FIG. 1 primarily serve the recognition of homogeneous contamination. To recognize local contamination or manipulations that are represented in practice by test spots having a specified re-emission capability of, for example, 20%, in accordance with the invention a front screen monitoring is provided that is based on the transmitted light beam 16 and will now be explained. Both are advantageously combined with one another to reduce the number of required test channels. The test channels can be completely dispensed with under certain circumstances.

Figure 2:
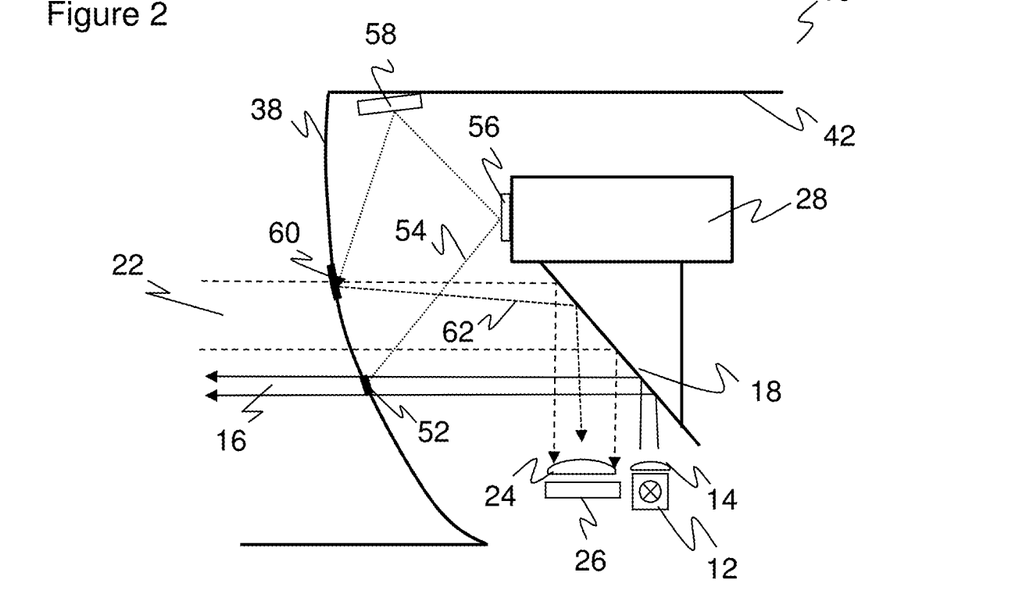
FIG. 2 a sectional representation of a front screen monitoring of a safety laser scanner by evaluating a twice-reflected front screen reflection beam.

FIG. 2 shows a part view of a sectional representation of a laser scanner 10 to explain the function principle of the test and manipulation detection of the front screen 38 by beam deflection. The front screen monitoring is based on the front screen reflection of the transmitted light beam 16 in a first region 52 of the front screen 38 where the transmitted light beam 16 exits the laser scanner 10. The portion of the transmitted light beam 16 reflected there is called a front screen reflection beam 54 and is deflected within the laser scanner 10 at a first light detection element 56 and at a second light deflection element 58 to again be incident on the front screen 38 in a further region 60. The two light deflection elements 56, 58 are formed as mirrors here and are attached to the motor holder 28 or to the hood cover 42. Alternatively, other forms of the light deflection would also be conceivable, for example via prisms, different attachment sites, and a different number of light deflections. Instead of separate light deflection elements 56, 58, correspondingly reflective or shiny surfaces can also be used, for example a first light deflection element 56 can be the black shiny surface of the motor holder.

The further region 60 is disposed in the optical path of the re-emitted light beam 22 since there a contamination or other impairment of the front screen 38 is relevant for the functional capability of the laser scanner 10. The front screen reflection beam 54 is reflected a further time in the further region 60 and the twice-reflected front screen reflection beam 62 that is produced is incident on the light receiver 26. This front screen monitoring is thus integrated into the actual measurement system for determining distances of objects in the monitored zone 20; no additional active components are required for this.

Figure 3:
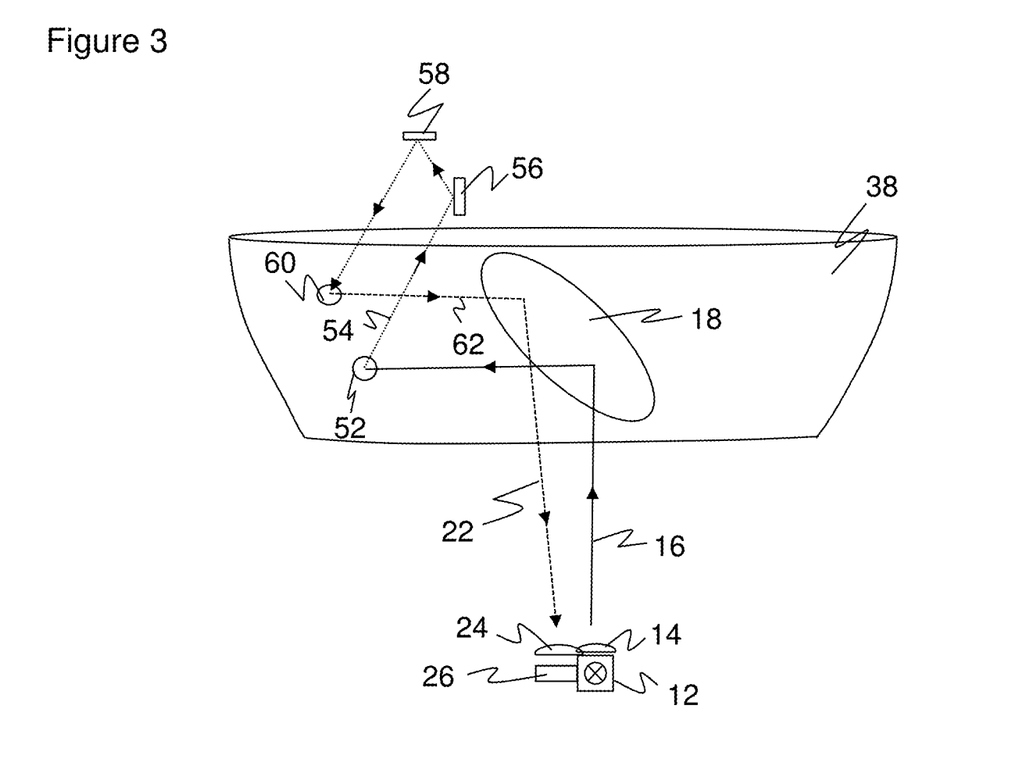
FIG. 3 a schematic three-dimensional representation of a front screen with the beam extent in accordance with FIG. 2.

Since this front screen monitoring is based on reflection and not transmission and dark dust particles can thus only be poorly recognized, for example, it is preferably combined with test channels in accordance with FIG. 1 depending on the safety category to be achieved. The measurement via the twice-reflected front screen reflection beam 62 then contributes the recognition of local impairments while the test channels are in particular responsible for a homogeneous contamination with dark dust particles. A re-emission capability of 20% that is sufficient for a reliable detection by means of beam deflection in accordance with FIG. 2 is required for the test spots that, in accordance with the safety standard IEC/EN 61496-3 named as representative here should simulate a local contamination or manipulation. The recognition of homogeneous contamination, on the other hand, takes place by random detection in relatively large angle segments of, for example, 45° and therefore substantially reduces the number of test channels with respect to a conventional front screen monitoring based solely on these test channels. FIG. 3 shows the beam deflections in a complementary manner in a corresponding schematic three-dimensional view of the front screen 38.

The detection sensitivity of the front screen monitoring is to be set such that, on the one hand, said test spots having a predefined re-emission capability are reliably detected and, on the other hand, there is not too sensitive a response to interference. The latter would not be a safety problem, but the laser scanner 10 would too frequently assume a functional failure that is actually not impending at all and the availability would thus be unnecessarily reduced. It can therefore be sensible to attenuate the front screen reflection beam 54 in the light deflections, for instance in that at least one of the light deflection elements 56, 58 is blacked out or masked or corresponding damping materials are selected. It is sufficient in some embodiments if at least one of the light deflection elements 56, 58 is formed by a dark shining surface of the motor holder or motor 28 or hood cover 42.

Figure 4:
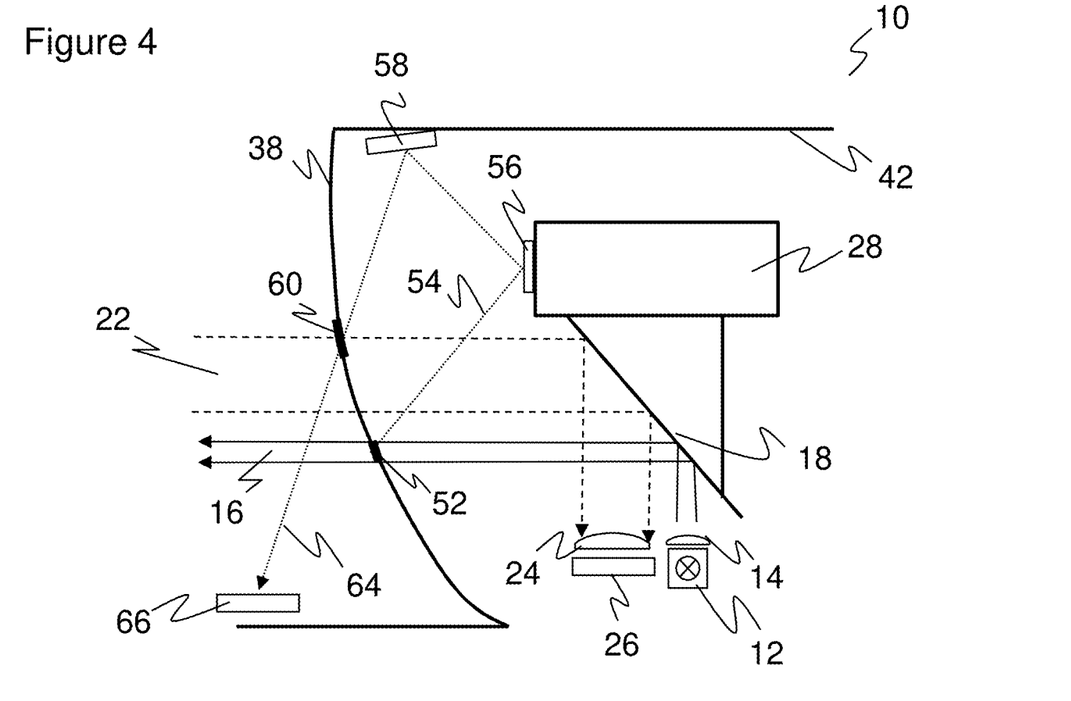
FIG. 4 a sectional representation of a front screen monitoring that, complementary to the situation of FIG. 2, evaluates a transmitted portion of a front screen reflection beam.

FIG. 4 shows in a view similar to FIG. 2 instead of the twice-reflected front screen reflection beam 52 the front screen reflection beam 64 that is transmitted in the further region 60 and that is complementary thereto. It can simply be absorbed on the base of the housing 36 in order not to disrupt a measurement. An additional light receiver 66 is instead provided at the base in FIG. 4. The front screen 38 can thus be additionally or alternatively be transmissively tested for impairments by the front screen reflection beam 54 in the further region 60. Dark contamination is thus also recognized on the basis of the front screen reflection beam 54 and conventional test channels are further reduced or even replaced. The additional light receiver 66 can moreover be used to monitor the output power of the light transmitter 12 or even to measure a time of flight and thus to satisfy a reference target function.

Figure 5:
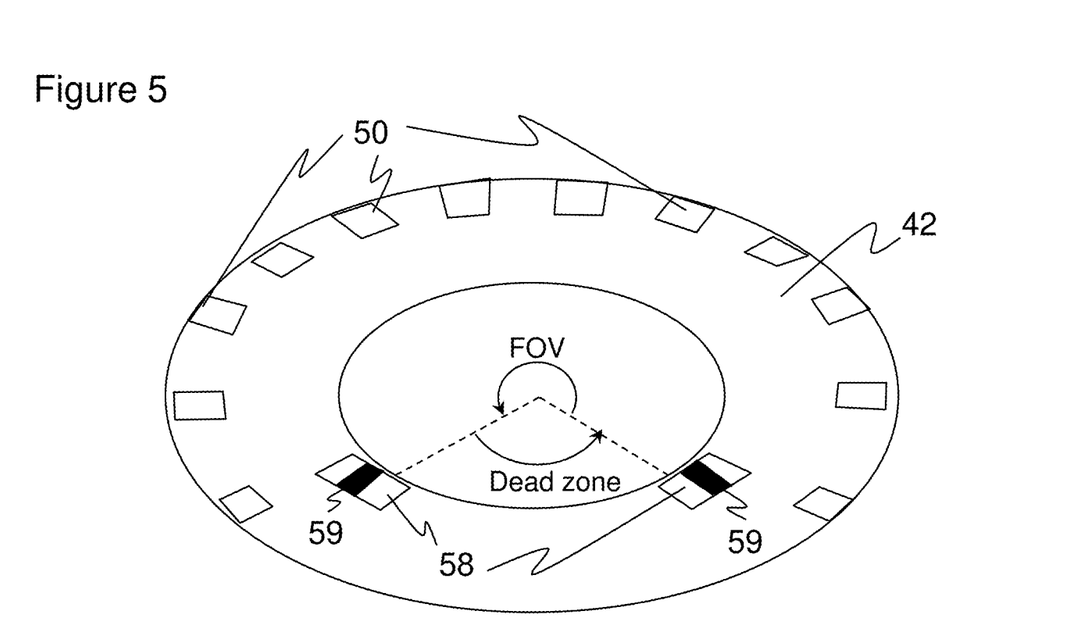
FIG. 5 a plan view of light deflections for a front screen monitoring with test channels and with evaluation of a front screen reflection beam.

FIG. 5 is a view of the lower side of the hood cover 42. In this embodiment, the laser scanner 10 only monitors a scan region or a field of view (FOV) of, for example, 270° of the complete 360° environment in the plane of the transmitted light beam 16. The remaining angular range, here between 270° and 360°, is called a dead zone since no objects are detected in the monitored zone 20 here. The field of view (FOV) can be smaller or greater than 360° in other embodiments.

Test light reflectors 50 that belong to corresponding test channels of a conventional part of the front screen monitoring are distributed over the field of view. In the transition region between the field of view and the dead zone, called a marginal region, second light deflection elements 58 are respectively provided for the deflection of the front screen reflection beam 54.

The front screen monitoring based on the front screen reflection beam 54 is therefore restricted to part regions of the field of view, the marginal regions here, in this embodiment. A particularly large number of conventional test channels would otherwise have to be arranged in this region, as will be subsequently explained with reference to FIGS. 6 to 8. Due to the additional front screen monitoring using the front screen reflection beam 54, a relatively coarse network of test channels is sufficient to recognize homogeneous dark contaminants therewith.

At first glance, it appears necessary to admittedly arrange the second light deflection elements 58 in the marginal region, but still within the field of view. In fact, however, the test spots or the local impairments to be assumed have a certain angular extent. This makes it possible to displace the light deflection elements 58 partially, as in FIG. 5, or even completely by at least a few degrees into the dead zone where they then test the marginal region of the front screen 38 in the field of view equally retroactively or proactively. The front screen monitoring takes place, for example, in a field of view of 0°-270°, only at 272.5° or 75° or already at 355° or 357.5°. Since the dead zone has construction reasons as a rule, the light paths for the front screen monitoring may naturally nevertheless be at least largely undisrupted at said angles.

The advantage of a front screen monitoring from the dead zone is the decoupling from the main measurement. This also makes it possible to switch the sensitivity of the main measurement system to the needs of the front screen monitoring. For example, the detection threshold and thus the sensitivity of the beam deflection with respect to a contaminated front screen 38 is set within the dead zone individually by software. The detection threshold is not freely variable within the field of view since the time of flight measurement and safe object detection predefines the parameterization.

Figure 6:
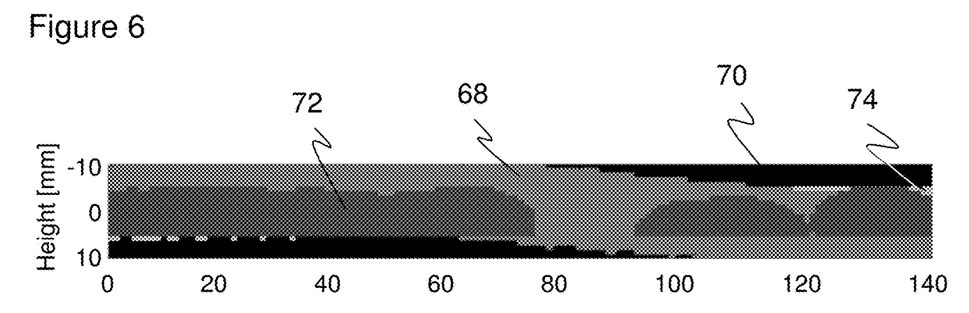
FIG. 6 a representation of a rolled up front screen with different zones in which a front screen monitoring with test channels recognizes and does not recognize contamination.
Figure 7:
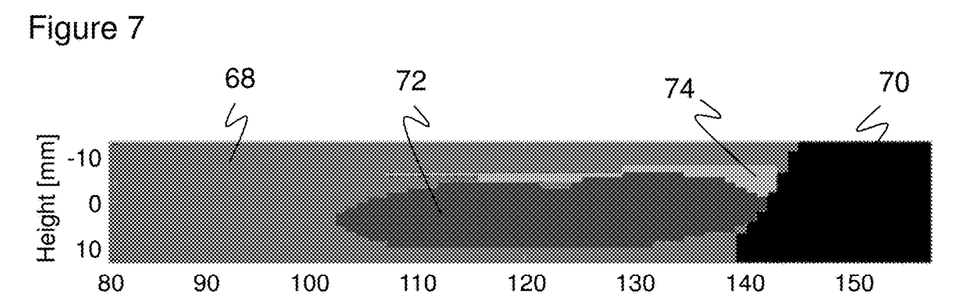
FIG. 7 an enlarged view in accordance with FIG. 6 over a smaller angular range in the marginal region to a dead zone.
Figure 8:
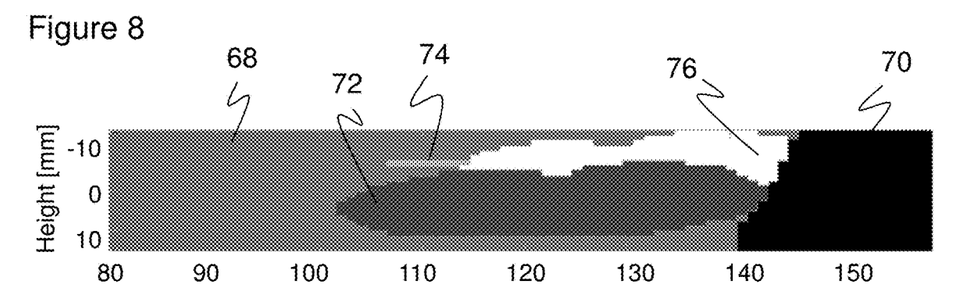
FIG. 8 a view corresponding to FIG. 7, now with an additional front screen monitoring based on the front screen reflection beam.

FIGS. 6 to 8 each show different regions of a front screen 38 shown rolled up in a gray coding, with the revolving or scan angle being shown in the X direction and the height in the Y direction. FIG. 6 shows the complete front screen 38 in the case of a front screen monitoring solely with test channels 44, 46, 50. The complete field of view of 280° in this example can be complemented by mirroring at the Y axis due to the symmetries here. FIG. 7 is a sectional enlargement of the angular range around 140° where the field of view transitions into the dead zone. FIG. 8 shows the situation of FIG. 7 when the test channels 44, 46, 50 are complemented in this transition region at 140° in a complementary manner by the front screen monitoring based on the front screen reflection beam 54.

In a mid-gray region 68, a test spot is detected directly via the transmitted light beam 16. The test spot is not detected in the black regions 70; however, this is also irrelevant since it is not a passage region of the re-emitted light beam 22. The dark gray regions 72 are covered by the test channels 44, 46, 50. However, light regions 74 remain in which the test spot remains unnoticed. This gap could be closed by additional test passages 44, 46, 60, but this requires a corresponding effort for a dense network of test channels 44, 46, 60. For understanding, it must still be added that the mid-gray region 68 performs something like an oscillation in the vertical direction over the different scan angles because the laser scanner 10 has a biaxial design. The transmitted light beam 16 and the re-emitted light beam 22 thereby rotate once around one another over a revolution of the deflection unit 22 as can be easily made clear by looking at the deflections offset by 1800 with respect to one another in FIGS. 1 and 2. This behavior of a biaxial laser scanner 10 makes the front screen monitoring more difficult.

As can be recognized in FIG. 8, a white region 76 in which the complemented front screen monitoring by the front screen reflection beam 54 detects the test spot almost completely displaces the light region 74 in which the test spot previously remained unnoticed. The remaining rest is irrelevant because only a very small portion of the re-emitted light beam 22 that does not cause any detection loss of the laser scanner 10 is hereby covered.

The restriction of the front screen monitoring with the front screen reflection beam 54 to the marginal region is only an example; alternatively, more regions, larger regions, or even the total field of view could be covered. The white region 76 in FIG. 8 would then increase accordingly and further, or even all, test channels 44, 46, 50 can be replaced in this manner.

In an advantageous embodiment of the laser scanner 10, not shown, the light deflection elements 56, 58 are configured as a kind of grid structure in which deflecting and absorbing regions 59 alternate with one another, that is light traps 59. A kind of differential measurement can thereby be carried out to take account of the superposition of the front screen monitoring with an object in the near region of the monitored zone 20. Without such a differential process, very close objects and an impaired front screen 38 cannot easily be separated from one another. Due to the comparison of the received signals with an absorbed and reflected front screen reflection beam 54, this is improved and the availability is thus increased with very short protected fields comprising objects close to the protected field.

A laser scanner 10 having a transmitted light beam 16 and thus one monitored plane has previously been described. The front screen monitoring in accordance with the invention can also be used with a multilayer scanner. This is a laser scanner that has a plurality of scan beams in elevation above one another and thus monitors a spatial zone through a plurality of planes or, more exactly, with a structure similar to nested hourglasses. The plurality of scan beams are produced by a plurality of light transmitters or beam splits and are accordingly received in a plurality of light receivers or in a light receiver having a plurality of reception zones or pixels.

Since a multilayer scanner detects an object in its plurality of planes, it is statistically less likely that there is a detection loss due to local or homogeneous contaminants. Even more conventional test channels can therefore be dispensed with or the front screen monitoring can be based solely on a non-deflected front screen reflection. It is furthermore sufficient to test the front screen only by some of the plurality of scan beams. A further advantage of this kind of front screen monitoring is that it can be supplemented in an existing multilayer scanner with a relatively small effort.

The invention claimed is:

1. A safety laser scanner (10) for detecting objects in a monitored zone (20) that has a light transmitter (12) for transmitting a scan beam (16), a movable deflection unit (18) for a periodic scanning of the monitored zone (20) by the scan beam (16), a light receiver (26) for generating a received signal from the scan beam (22) re-emitted by the objects, a front screen (38), and a control and evaluation unit (32) that is configured to acquire information on the objects in the monitored zone (20) from the received signal and to recognize an impaired light permeability of the front screen (38) in a front screen monitoring by evaluating a front screen reflection beam (54) that is generated from the scan beam (16) by reflection at the front screen (38), characterized by at least one light deflection element (56, 58) in the optical path of the front screen reflection beam (54) that guides the front screen reflection beam (54) to the front screen (38) again in a region (60) to be tested so that a twice-reflected front screen reflection beam (62) is produced by reflection at the region (60) to be tested.

2. The safety laser scanner (10) in accordance with claim 1, wherein the control and evaluation unit (32) is configured to evaluate the received signal generated by the twice-reflected front screen reflection beam (62) in the light receiver (26) for the front screen monitoring.

3. The safety laser scanner (10) in accordance with claim 1, that has at least one external additional light receiver (66) on which a portion (64) of the front screen reflection beam (54) transmitting the region (60) to be tested is incident and wherein the control and evaluation unit (32) is configured to evaluate the received signal of the additional light receiver (66) for the front screen monitoring.

4. The safety laser scanner (10) in accordance with claim 1, wherein the light transmitter (12) and the light receiver (26) are arranged next to one another with mutually parallel optical axes in a biaxial design.

5. The safety laser scanner (10) in accordance with claim 1, that has at least one pair of test light transmitters (44) and test light receivers (46) for the additional front screen monitoring that are arranged in the manner of a through beam light barrier or of a reflection light barrier to check a partial region of the front screen (38) for light permeability by a transmission measurement.

6. The safety laser scanner (10) in accordance with claim 1, wherein the at least one light deflection element (56, 58) is only provided in at least one partial region of a field of view of the safety laser scanner (10) so that the front screen monitoring based on the front screen reflection beam (54) only relates to the partial region.

7. The safety laser scanner (10) in accordance with claim 6, wherein the partial region is a marginal region between the field of view and a dead zone outside the field of view, with the at least one light deflection element (56, 58) in particular being provided in the dead zone.

8. The safety laser scanner (10) in accordance with claim 7, wherein the control and evaluation unit (32) is configured to adapt the sensitivity of the detection of the twice-reflected front screen reflection beam (62) in the light receiver (26) and/or the evaluation of the received signal thereby generated in the marginal region.

9. The safety laser scanner (10) in accordance with claim 1, wherein the front screen (38) has the shape of a rotational body and a curved contour in section, in particular a contour curved in cup shape.

10. The safety laser scanner (10) in accordance with claim 1, that has a first and a second light deflection element (56, 58) in the optical path of the front screen reflection beam (54), wherein the first light deflection element (56) is in particular arranged at a centrally arranged motor holder and the second light deflection unit (58) is arranged at a cover (42) of the safety laser scanner (10).

11. The safety laser scanner (10) in accordance with claim 1, wherein the at least one light deflection element (56, 58) is configured as beam attenuating; and/or wherein a reference light receiver is arranged in the optical path of the front screen reflection beam (54), in particular at the at least one light deflection element (56, 58).

12. The safety laser scanner (10) in accordance with claim 1, wherein the at least one light deflection element (56, 58) and a light trap are respectively partially arranged in the direction of revolution of the movement of the deflection unit (18) to enable a differential front screen monitoring by a comparison of the received signals.

13. The safety laser scanner (10) in accordance with claim 1, that is configured as a multilayer scanner having a plurality of scan beams separated in elevation, with at least one of the scan beams being used for the front screen monitoring.

14. The safety laser scanner (10) in accordance with claim 1, that has a safe output (34) and whose control and evaluation unit (32) is configured to compare the position of detected objects with protected fields and to control the safe output (34) by a safeguarding signal on recognition of an unauthorized protected field intrusion.

15. A method of front screen monitoring of a front screen (38) of a safety laser scanner (10), in particular of a safety laser scanner (10) in accordance with any one of the preceding claims, wherein a scan beam (16) is transmitted, the monitored zone (20) is periodically scanned by the scan beam (16), a received signal is generated from the scan beam (22) re-emitted by objects in the monitored zone (20) and is evaluated to acquire information on the objects and to recognize an impaired light permeability of the front screen (38) by evaluating a front screen reflection beam for the front screen monitoring that is generated from the scan beam by reflection at the front screen (38), characterized in that the front screen reflection beam (54) is again guided by at least one light deflection element (56, 58) to the front screen (38) in its optical path in a region (60) to be tested so that a twice-reflected front screen reflection beam (62) is produced by reflection at the region (60) to be tested.

\* \* \* \* \*